United States Patent
Mori et al.

(10) Patent No.: US 10,177,553 B2
(45) Date of Patent: Jan. 8, 2019

(54) POWER SWITCHING CONTROL APPARATUS AND SWITCHING CONTROL METHOD THEREFOR

(71) Applicant: Mitsubishi Electric Corporation, Chiyoda-ku, Tokyo (JP)

(72) Inventors: Tomohito Mori, Tokyo (JP); Aya Yamamoto, Tokyo (JP); Daisuke Yoshida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 291 days.

(21) Appl. No.: 14/911,958

(22) PCT Filed: Oct. 17, 2013

(86) PCT No.: PCT/JP2013/078195
§ 371 (c)(1),
(2) Date: Feb. 12, 2016

(87) PCT Pub. No.: WO2015/056326
PCT Pub. Date: Apr. 23, 2015

(65) Prior Publication Data
US 2016/0301199 A1    Oct. 13, 2016

(51) Int. Cl.
*H02H 3/08* (2006.01)
*H02H 1/00* (2006.01)
(Continued)

(52) U.S. Cl.
CPC ........ *H02H 1/0007* (2013.01); *H01H 33/027* (2013.01); *H01H 33/59* (2013.01);
(Continued)

(58) Field of Classification Search
USPC .......................................... 361/93.2, 94, 115
See application file for complete search history.

(56) References Cited

U.S. PATENT DOCUMENTS 5,521,482 A  *  5/1996  Lang .................... G01R 31/343
                                                          318/800
6,172,863 B1    1/2001  Ito et al.
(Continued)

FOREIGN PATENT DOCUMENTS

CN          1258086 A     6/2000
JP      2000-188044 A     7/2000
(Continued)

OTHER PUBLICATIONS

*International Search Report (PCT/ISA/210) dated Nov. 19, 2013, by the Japanese Patent Office as the International Searching Authority for International Application No. PCT/JP2013/078195.
(Continued)

*Primary Examiner* — Ronald W Leja
(74) *Attorney, Agent, or Firm* — Buchanan Ingersoll & Rooney PC (57) ABSTRACT

A power switching control apparatus includes a current measurement unit that measures the current of a main circuit; a current estimation unit that detects a fault current on the basis of a current measurement value and estimates a future current waveform on the basis of a current waveform measured in a given duration after the detection; a target opening time determination unit that uses a current zero point obtained from the estimated current waveform, a predicted opening time, and a given minimum arc duration so as to determine a time by subtracting a sum of the opening time and the minimum arc duration from the current zero point as the target opening time; and an opening control unit that waits until the nearest one of the target opening times is reached and transmits an interruption control signal when the target opening time is reached.

17 Claims, 7 Drawing Sheets

(51) Int. Cl.
*H01H 33/59* (2006.01)
*H01H 33/02* (2006.01)
*H01H 47/00* (2006.01)
*H02H 3/16* (2006.01)
*H02H 3/02* (2006.01)

(52) U.S. Cl.
CPC ........ *H01H 33/593* (2013.01); *H01H 47/002* (2013.01); *H02H 3/021* (2013.01); *H02H 3/08* (2013.01); *H02H 3/16* (2013.01)

(56) References Cited

U.S. PATENT DOCUMENTS

| | | | |
|---|---|---|---|
| 6,597,999 B1* | 7/2003 | Sinha | H01H 9/56 361/93.2 |
| 2005/0013080 A1 | 1/2005 | Pilz et al. | |
| 2008/0123234 A1 | 5/2008 | Koyama et al. | |
| 2009/0058573 A1 | 3/2009 | Mori et al. | |
| 2015/0294814 A1* | 10/2015 | Kobayashi | H01H 9/563 361/115 |
| 2016/0187409 A1* | 6/2016 | Kolker | G01R 31/025 361/42 |
| 2016/0225548 A1* | 8/2016 | Mori | H01H 9/56 |
| 2016/0301199 A1* | 10/2016 | Mori | H01H 33/59 |
| 2017/0358404 A1* | 12/2017 | Talluri | H01H 9/56 |

FOREIGN PATENT DOCUMENTS

| | | |
|---|---|---|
| JP | 2000-207982 A | 7/2000 |
| JP | 2005-512494 A | 4/2005 |
| JP | 2008-136290 A | 6/2008 |
| JP | 2009-59662 A | 3/2009 |

OTHER PUBLICATIONS

*Written Opinion (PCT/ISA/237) dated Nov. 19, 2013, by the Japanese Patent Office as the International Searching Authority for International Application No. PCT/JP2013/078195.

*Notice of Rejection dated May 13, 2014, in the corresponding Japanese Application No. 2014-505425.

Office Action dated Apr. 6, 2017, by the Chinese Patent Office in corresponding Chinese Patent Application No. 201380080211.4 and English translation of the Office Action. (11 pages).

Office Action dated Nov. 1, 2017, by the Canadian Intellectual Property Office in corresponding Canadian Patent Application No. 2,927,413. (4 pages).

Office Action dated Jul. 12, 2018, by the Canadian Patent Office in corresponding Canadian Patent Application No. 2,927,413. (4 pages).

* cited by examiner

POWER SWITCHING CONTROL APPARATUS AND SWITCHING CONTROL METHOD THEREFOR

FIELD

The present invention relates to a power switching control apparatus that controls the switching of a power switching apparatus and a switching control method therefor.

BACKGROUND

Circuit breakers for electric power have a role to interrupt a fault current flowing in a transmission line when a fault occurs in a system, such as a ground fault or a short circuit fault. Such circuit breakers open when receiving interruption control signals generally from protective relays that have detected fault currents. Because such a protective relay outputs an interruption control signal immediately after the detection of a fault current, the time at which an interruption control signal outputs from the protective relay is at random with respect to the phase of voltage or current. Thus, the arc duration, which is from when the circuit breaker opens (when its electrode contact is separated) until when the fault current is interrupted at the next current zero point where it is possible to interrupt the current, can be short or long. When the arc duration is long, the amount of erosion of the electrode contact increases and the system restoration is delayed.

A conventional power switching control apparatus measures a current and, by using the time interval between the current zero points and the current gradient, estimates a time interval between future current zero points so as to control the opening timing such that the current is interrupted with the minimum arc duration (for example, Patent Literature 1).

CITATION LIST

Patent Literature

Patent Literature 1: Japanese Patent Application Laid-Open No. 2000-188044

SUMMARY

Technical Problem

As described above, the switching control method by using a protective relay can result in a long arc duration, and, in such cases, the amount of erosion of an electrode contact increases and a duration for removing the fault also increases.

Even the conventional power switching control apparatus described above can minimize the arc duration, it needs to measure at least three current zero points and it requires the measurement duration of more than or equal to 1.5 cycles. Hence, under such a condition as with a short circuit fault, in which a fault current needs to be interrupted within two or three cycles after an interruption control signal is output to a circuit breaker, the conventional power switching control apparatus needs the fault removal duration of more than or equal to 3.5 cycles. Such an operation makes it difficult for a circuit breaker to function to remove a fault in a short time.

The present invention has been achieved in view of the above, and it is an objective of the present invention to provide a power switching control apparatus that enables the amount of erosion of an electrode contact to reduce when the flow is shut up by the fault and that enables the duration for recovering from the fault to reduce as well as a switching control method therefor.

Solution to Problem

In order to solve the problem and achieve the objective mentioned above, the present invention relates to a power switching control apparatus that includes: a current measurement unit that measures a current of a main circuit connected to a circuit breaker placed in a power system; a current estimation unit that detects a fault current on a basis of a current measurement value measured by the current measurement unit and estimates, on a basis of a current waveform measured in a preset given duration from a time at which the fault current is detected, a current waveform after the given duration has elapsed; a target opening time determination unit that determines a time obtained by subtracting a sum of an opening time and a minimum arc duration from a current zero point as a target opening time by using the current zero point, which is a time the current, of which a current waveform is estimated by the current estimation unit, becomes zero, a predicted opening time, and the minimum arc duration, which is a minimum duration necessary after opening of electrode contacts of the circuit breaker until an arc between the electrode contacts is extinguished; and an opening control unit that calculates a standby duration for reaching the nearest one of the target opening times, waits for the standby duration, and transmits an interruption control signal for interrupting the circuit breaker when the target opening time is reached.

Advantageous Effects of Invention

The present invention estimates a future current waveform on the basis of a current waveform measured in a given duration after the detection of a fault current and determines a target opening time by using the estimated current waveform such that an arc duration is minimized; thus, by setting the given duration shorter than a measurement duration that is necessary for a conventional technique to estimate a current zero point, the present invention has an effect that enables the amount of erosion of electrode contacts to be reduced when the current is shut off due to a fault and enables the duration for recovering from the fault to be reduced.

DESCRIPTION OF EMBODIMENTS

Exemplary embodiments of a power switching control apparatus and a switching control method according to the present invention will now be described with reference to the drawings. The present invention is not limited to the embodiments.

First Embodiment

Figure 1:
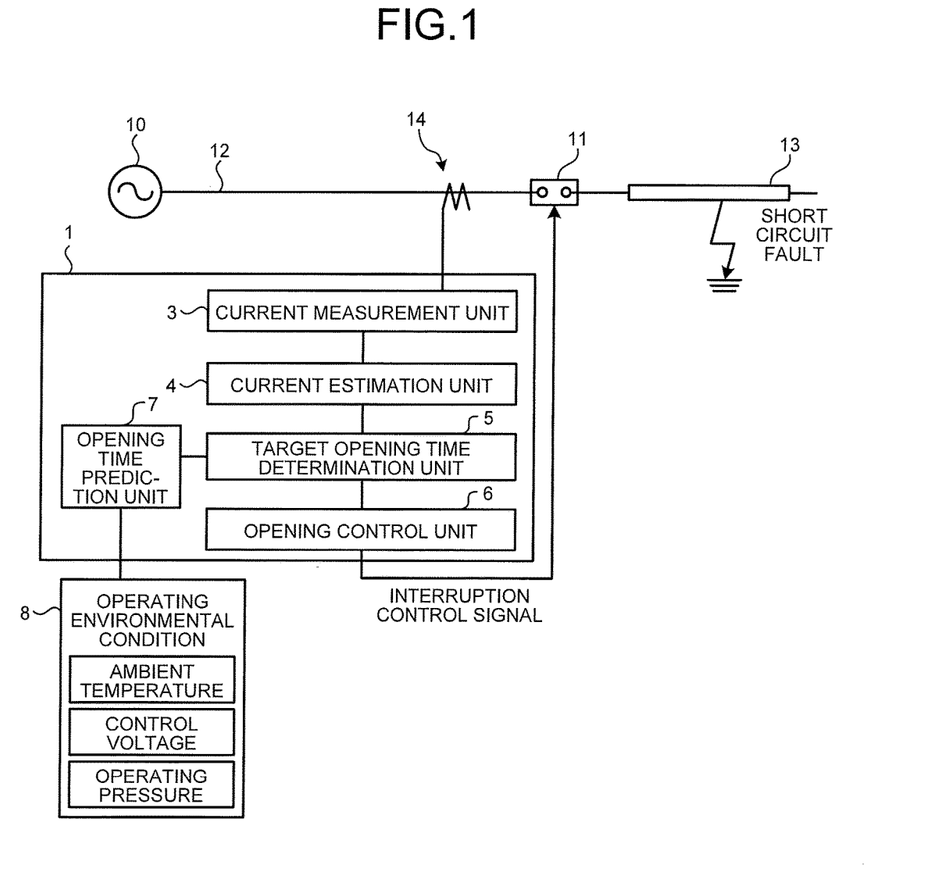
FIG. 1 is a diagram illustrating an exemplary configuration of a power switching control apparatus according to a first embodiment.

FIG. 1 is a diagram illustrating an exemplary configuration of a power switching control apparatus according to the present embodiment. As illustrated in FIG. 1, the power system includes, for example, a power source 10, a circuit breaker 11, a main circuit 12, a transmission line 13, and the like. The circuit breaker 11 being interposed between the power source 10 and the transmission line 13 and connected to a power switching control apparatus 1. The circuit breaker 11 is also connected to the main circuit 12, which is provided with an instrument current transformer 14 to measure the current flowing through the main circuit 12, and the output of the instrument current transformer 14 is input to the power switching control apparatus 1.

The power source 10 is a three-phase AC power source. The circuit breaker 11, which functions as a power switching apparatus, is, for example, a gas circuit breaker. Note that the configuration illustrated in FIG. 1 is only for one of the three phases, and those for the other two phases are omitted.

The power switching control apparatus 1 includes a current measurement unit 3, which measures the current of the main circuit 12; a current estimation unit 4, which estimates a future current waveform on the basis of the current waveform measured by the current measurement unit 3; an opening time predicts unit 7, which predicts the duration of the opening of the circuit breaker 11; a target opening time determination unit 5, which determines the time at which it is intended the circuit breaker 11 will open, the determination being made on the basis of the current waveform estimated by the current estimation unit 4, the opening time predicted by the opening time prediction unit 7, and a minimum arc duration, which will be described hereinafter; and an opening control unit 6, which outputs an interruption control signal to the circuit breaker 11 such that the circuit breaker 11 opens at the target opening time determined by the target opening time determination unit 5. Note that the power switching control apparatus 1 also includes a closing control function for the circuit breaker 11, although its description is omitted herein. The power switching control apparatus 1 is configured from, for example, a computer.

The current measurement unit 3 is connected to the instrument current transformer 14 and measures the current during, for example, a certain cycle and then outputs the current measurement value to the current estimation unit 4.

The current estimation unit 4 is connected to the current measurement unit 3 and determines whether or not the measured current is a fault current by using the current measurement value from the current measurement unit 3. Here, a fault current refers to a current that flows through the transmission line when a system fault occurs such as a ground fault or a short circuit fault and that has amplitude significantly larger than that of a normal load current.

Whether the current is a fault current can be determined by, for example, determining whether a current effective value calculated by using the current measurement value is equal to or more than a preset threshold. Note that the fault current can be detected by other methods, such as by using the gradient of the current.

On detecting a fault current, the current estimation unit 4 estimates a current waveform after the elapse of a given duration. The estimation is made on the basis of a current measurement value during a preset given duration starting from the time at which the fault current is detected (fault detection time), i.e., a current waveform measured within the given duration.

The current estimation unit 4 estimates the current waveform as a composite waveform of multifrequencies. Specifically, the current waveform at the time t can be expressed by using the expression below with the following wave parameters: $A_i$ represents amplitude, $\sigma_i$ ($<0$) represents an attenuation factor (attenuation time constant), $f_i$ represents frequency, and $\phi_i$ represents a phase.

[Expression 1]

$$y(t) = \sum_{i=1}^{M} A_i \exp(\sigma_i t)\cos(2\pi f_i t + \phi_i) \quad (1)$$

Here, M represents a preset number of components of the composite waveform, with i being an integer value from 1 to M. By determining all the waveform parameters in the expression 1 described above by using current measurement values, a current waveform at any time t can be estimated. The current estimation unit 4 can determine all the waveform parameters by, for example, the method of least squares.

The given duration described above, which is the measurement duration for a current waveform, can be set to such a short duration that the number of current zero points included in the given duration is not more than two. The given duration can also be set to a duration shorter than the fault detection duration of a conventional protective relay that is used for the opening control of the circuit breaker 11. When the given duration is set to a sufficiently short duration as described above, a future current waveform can be determined on the basis of the expression 1 described above with adequate precision, as long as the number of current measurement values used is at least the number necessary to determine all the waveform parameters.

The opening time prediction unit 7 predicts an opening time on the basis of an operating environmental condition 8 of the circuit breaker 11 input from outside the apparatus. The opening time is the operating duration necessary from when an interruption control signal is input to the circuit breaker 11 until when a main contact (electrode contact) of the circuit breaker 11 is separated. The operating environmental condition 8 includes, for example, the ambient temperature of the circuit breaker 11, the control voltage when the circuit breaker 11 is actuated, and the operating pressure (for example, hydraulic pressure) when the circuit breaker 11 is actuated.

The target opening time determination unit 5 is connected to the current estimation unit 4 and the opening time prediction unit 7. The target opening time determination unit 5 determines a target opening time on the basis of a current waveform estimated by the current estimation unit 4, an opening time predicted by the opening time prediction unit 7, and a given minimum arc duration for the circuit breaker 11. More specifically, the target opening time determination unit 5 obtains a current zero point, which is a time at which the current becomes zero, from the estimated current waveform, and it sets a time, obtained by subtracting the sum of the opening time and the minimum arc duration from the current zero point, as the target opening time. Note that, in general, the number of current zero points to be obtained is more than one, and thus the same number of target opening times is set. Here, the minimum arc duration is the minimum duration that is necessary after the main contact of the circuit breaker 11 is opened until an arc generated between the contacts is extinguished. The minimum duration is previously given in accordance with the model of the circuit breaker 11.

The opening control unit 6 is connected to the target opening time determination unit 5, and, on receiving target opening times from the target opening time determination unit 5, it calculates a standby duration that is the duration until the nearest target opening time is reached, waits for the standby duration, and then outputs an interruption control signal to the circuit breaker 11 when the target opening time is reached.

Figure 2:
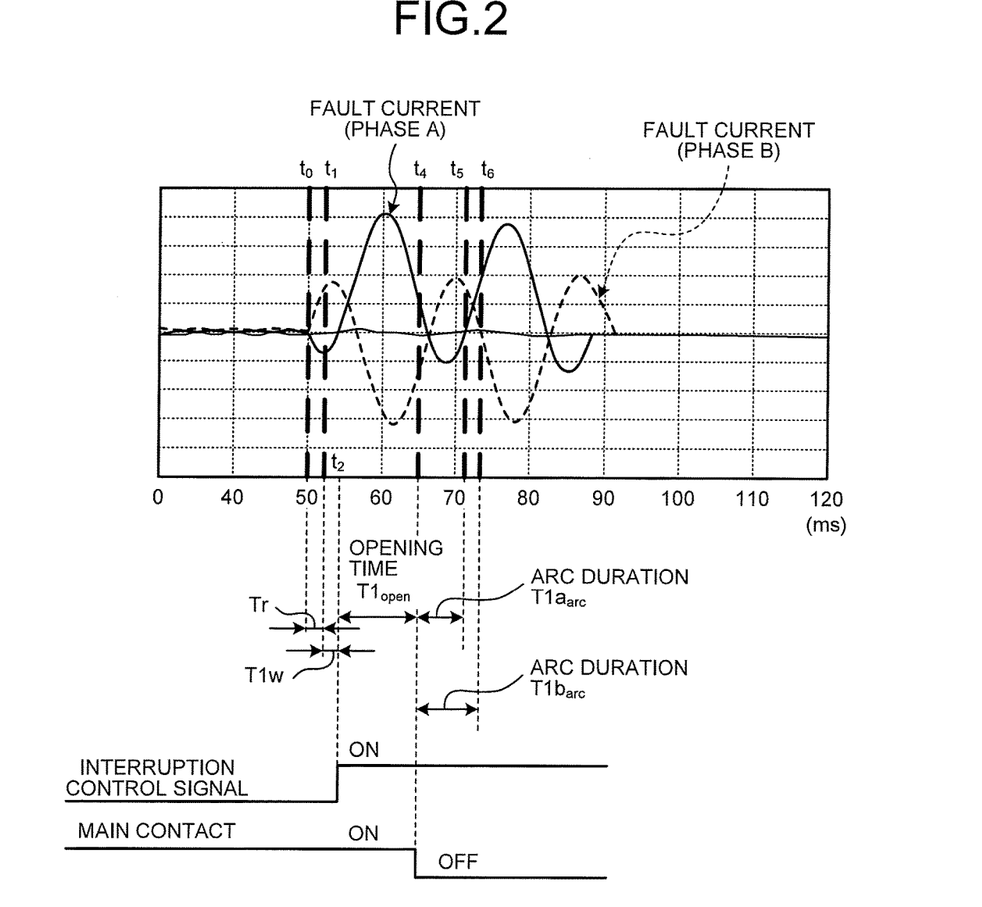
FIG. 2 is a diagram illustrating current behavior before and after the interruption of a fault current and an exemplary control sequence according to the first embodiment.

The operation, i.e., a switching control method, according to the present embodiment will now be described with reference to FIG. 2. FIG. 2 is a diagram illustrating current behavior before and after the interruption of a fault current and an exemplary control sequence according to the present embodiment.

The upper part of FIG. 2 illustrates current waveforms, with the horizontal axis representing the time (ms) and the vertical axis representing the current value. In the illustrated example, a system fault occurs at a time $t_0$. The system fault is, for example, a double line-to-ground fault in which ground faults have occurred in phase A and in phase B.

The current measurement unit 3 detects a fault current immediately after the time $t_0$. The current measurement unit 3 can, for example, calculate a current effective value from a current measurement value, and it detects the current effective value above a preset threshold so as to detect the fault current.

The current estimation unit 4, when notified of the occurrence of the fault by the current measurement unit 3, estimates, on the basis of a current waveform measured in a preset given duration $T_r$ from the fault detection time, a current waveform after the elapse of the given duration. In FIG. 2, $t_1-t_0=T_r$, and a current waveform on and after the time $t_1$ is estimated; especially the current waveforms of a fault current (the phase A) and a fault current (the phase B) are estimated. A current waveform is estimated by determining the waveform parameters of the expression 1 described above. Although a fault current has no rated frequency, is noncyclic, has an inconstant zero point interval, and has an asymmetrical waveform, its current waveform can be estimated with high precision by determining the waveform parameters of the expression 1 described above. The duration $T_r$ is a short duration of, for example, approximately several ms, and it has a length that contains one current zero point at most; the detection and estimation of a fault current waveform is performed during such a short duration.

The opening time predication unit 7 predicts an opening time on the basis of the operating environmental condition 8.

The target opening time determination unit 5 then sets a time, which satisfies that the current zero point−(the opening time $T1_{open}$+the minimum arc duration)≥0, as a target opening time on the basis of a current zero point obtained from a current waveform estimated by the current estimation unit 4, an opening time $T1_{open}$ predicted by the opening time prediction unit 7, and a minimum arc duration. The target opening time determination unit 5 outputs the target opening time to the opening control unit 6. The opening time satisfies $T1_{open}=t_4-t_2$. In place of the opening time prediction unit 7 being provided in the power switching control apparatus 1, a predicted opening time may be provided to the target opening time determination unit 5 in advance.

The opening control unit 6 then outputs an interruption control signal to the circuit breaker 11 at the nearest target opening time $t_2$ out of the target opening times. That is, the opening control unit 6 calculates the standby duration $T1_w=t_2-t_1$ after the time $t_1$, waits for $T1_w$, and then outputs an interruption control signal to the circuit breaker 11 when the target opening time $t_2$ is reached. The lower part of FIG. 2 illustrates the interruption control signal being ON at and after the time $t_2$. It also illustrates the main contact (an electrode contact) of the circuit breaker 11 being turned OFF at the time $t_4$.

The arc duration is minimized with the switching control method according to the present embodiment. Specifically, the arc duration of the fault current (the phase A), $T1a_{arc}=t_5-t_4$, is equal to the minimum arc duration. The arc duration of the fault current (the phase B), $T1b_{arc}=t_6-t_4$, is slightly longer than the arc duration of the fault current (the phase A) $T1a_{arc}$.

Note that FIG. 2 illustrates a case in which the circuit breaker 11 is interrupted for the three phases simultaneously. In this case, the earliest target opening time determined by the current zero point of the phase A is earlier than the earliest target opening time determined by the current zero point of the phase B; thus, the opening control unit 6 outputs an interruption control signal to the circuit breaker 11 at the nearest target opening time $t_2$ of the phase A.

In the case where the circuit breakers 11 are interrupted individually for the three phases, the switching control method described above is applicable to the fault current of each phase.

As described above, in the present embodiment, a future current waveform is estimated on the basis of a current waveform measured in a given duration $T_r$ after the detection of a fault current, and a target opening time is determined by using the estimated current waveform such that the arc duration is minimized. Because the given duration $T_r$ is set to a short duration of approximately several ms in this operation, the fault removal duration can be reduced. In other words, because the arc duration is minimized, the amount of erosion of an electrode contact can be reduced; furthermore, because the measurement duration necessary for the estimation is reduced while the precision with which the current waveform is estimated is maintained, the fault removal duration can be reduced in addition to minimizing the arc duration. Additionally, by reducing the amount of erosion of an electrode contact, the period before replacement of the electrode contact can be increased. Moreover, by further reducing the fault removal duration, the recovery from a system fault can be achieved earlier, thereby achieving system stabilization.

In contrast, with a conventional switching control method performed by a protective relay, the protective relay detects a fault current over a duration of approximately 5 to 6 ms after the occurrence of the fault, which is shorter than $T_r$, and then outputs a protective relay control output, which is an interruption control signal, immediately to a circuit breaker. In this case, the output timing of a protective relay control output from the protective relay is random with respect to the phase of voltage or current, and thus the length of the arc duration also varies within a range equal to or greater than the minimum arc duration. When the arc duration is long, the amount of erosion of an electrode contact increases and the system recovery takes longer.

Figure 7:
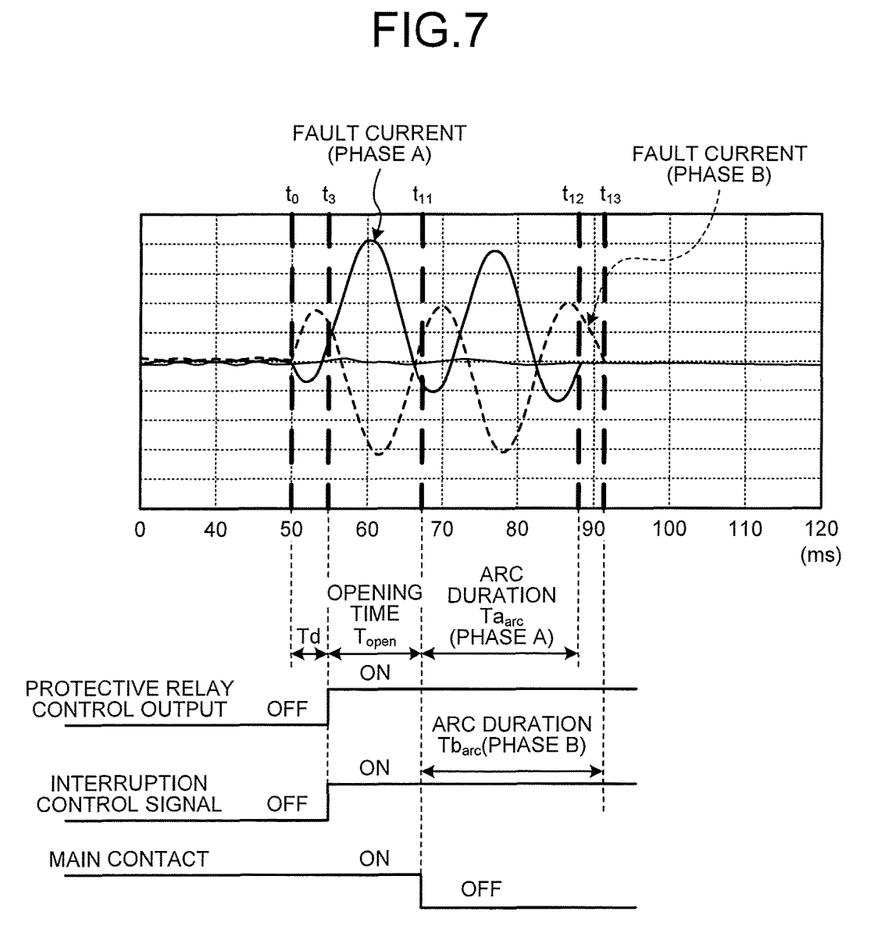
FIG. 7 is a diagram illustrating current behavior before and after the interruption of a fault current and also an exemplary control sequence by a conventional protective relay.

FIG. 7 is a diagram illustrating current behavior before and after the interruption of a fault current and an example control sequence performed by a conventional protective relay. Note that the opening time and the minimum arc duration in FIG. 7 are identical values to those of the opening time and the minimum arc duration, respectively, in FIG. 2. After the occurrence of a fault at a time $t_0$, the protective relay detects a fault current in a duration of $T_d$ and then outputs a protective relay control output to a circuit breaker immediately (a time $t_3$). Because the protective relay control output is an interruption control signal, the interruption control signal is also output at the time $t_3$. Here, an expression $T_d = t_3 - t_0$ is satisfied. The opening time of the circuit breaker is expressed by $T_{open} = t_{11} - t_3$, with the main contact (an electrode contact) of the circuit breaker turned OFF at the time $t_{11}$. The arc duration of the fault current (the phase A) satisfies $Ta_{arc} = t_{12} - t_{11}$, and the arc duration of the fault current (the phase B) satisfies $Tb_{arc} = t_{13} - t_{11}$, with both of the above longer than the arc duration in the present embodiment.

In the case of the conventional power switching control apparatus described in Patent Literature 1, although the arc duration can be minimized, at least three current zero points need to be measured, which results in an increased measurement duration and an increased fault removal duration.

In contrast, in the present embodiment, by employing the method of estimating a current waveform by using the expression 1 described above, the measurement duration of a current to be used for the estimation of a current waveform can be reduced, and thus the fault removal duration can be reduced. Specifically, the duration $T_r$ can be a short duration that includes not more than two current zero points, preferably one current zero point at the most, and that can be less than the fault detection duration of a conventional protective relay.

Second Embodiment

Figure 3:
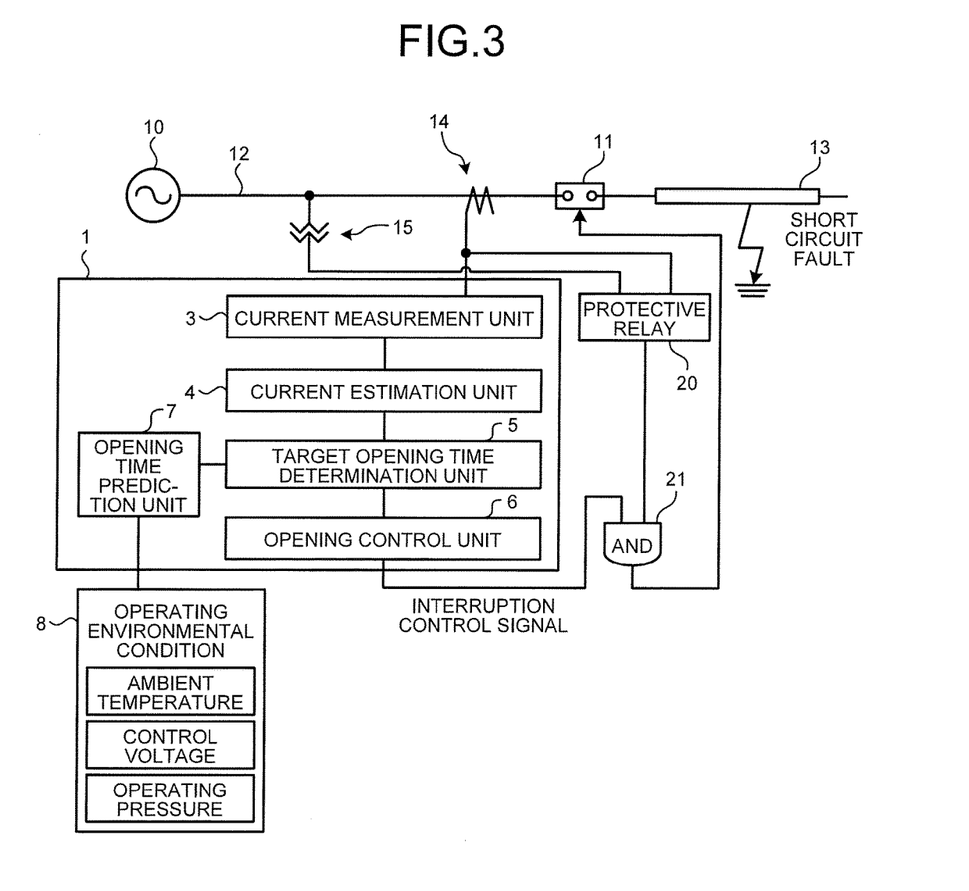
FIG. 3 is a diagram illustrating an exemplary configuration of a power switching control apparatus according to a second embodiment.

FIG. 3 is a diagram illustrating an exemplary configuration of a power switching control apparatus according to the present embodiment. As illustrated in FIG. 3, a power system includes a protective relay 20. A potential transformer 15, which measures the voltage of a main circuit 12, is placed on the main circuit 12. The protective relay 20 is connected to an instrument current transformer 14 and the potential transformer 15, and the output of the instrument current transformer 14 and the output of the potential transformer 15 are input to the protective relay 20. A power switching control apparatus 1 and the protective relay 20 are connected to an AND circuit 21, and the AND circuit 21 is connected to a circuit breaker 11. The AND circuit 21 is, for example, provided outside the power switching control apparatus 1, although it may be provided inside the power switching control apparatus 1. The other parts of the configuration of the present embodiment are identical with those in the first embodiment; the components in FIG. 3 identical with those in FIG. 1 are designated with identical symbols and their detailed description is omitted.

A switching control method according to the present embodiment will now be described. The operation of the power switching control apparatus 1 is as described in the first embodiment, and the opening control unit 6 outputs an interruption control signal at a target opening time. This interruption control signal is input to the AND circuit 21.

The protective relay 20 detects a fault current after the occurrence of a fault on the basis of the output of the instrument current transformer 14 and the output of the potential transformer 15 and immediately outputs a protective relay control output, which functions as an interruption control signal. This protective relay control output is input to the AND circuit 21.

The AND circuit 21 outputs an interruption control signal to the circuit breaker 11 when the AND circuit 21 receives both the interruption control signal from the opening control unit 6 and the protective relay control output from the protective relay 20.

In the present embodiment, the circuit breaker 11 is interrupted when a fault current is detected by both of the protective relay 20 and the power switching control apparatus 1; thus, the reliability of the system protection is improved. The other effects of the present embodiment are as described in the first embodiment.

Third Embodiment

Figure 4:
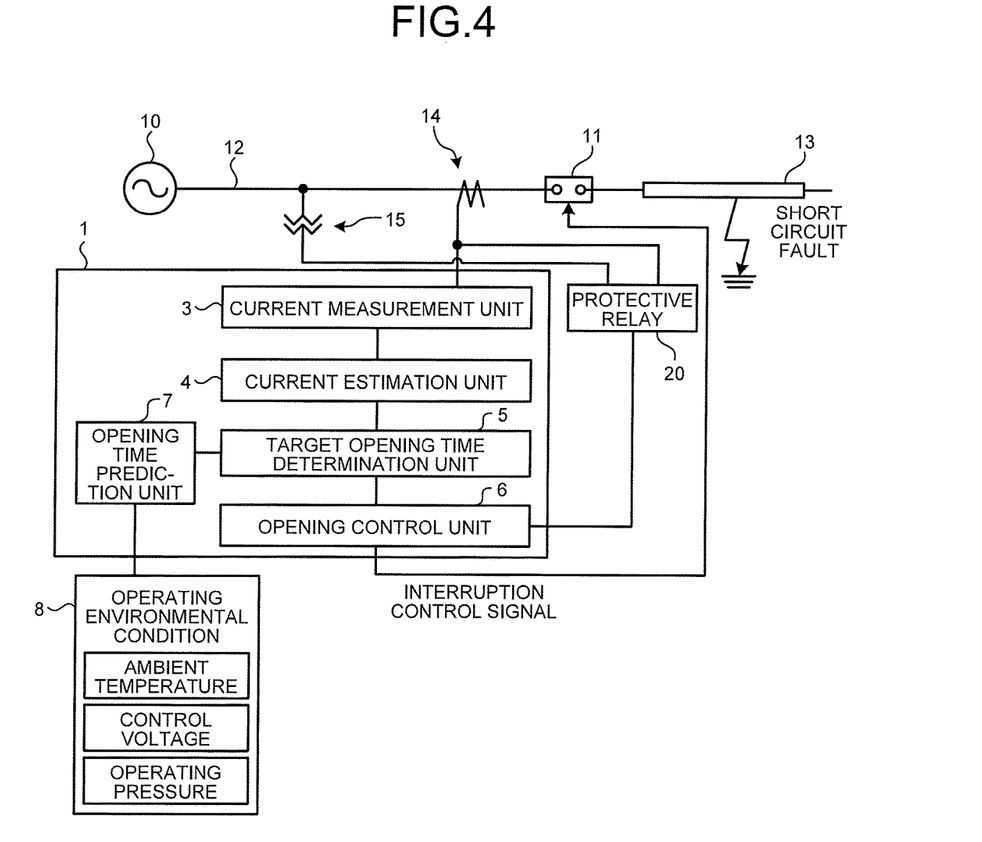
FIG. 4 is a diagram illustrating an exemplary configuration of a power switching control apparatus according to a third embodiment.

FIG. 4 is a diagram illustrating an exemplary configuration of a power switching control apparatus according to the present embodiment. As illustrated in FIG. 4, a power system includes a protective relay 20. A potential transformer 15, which measures the voltage of a main circuit 12, is placed on the main circuit 12. The protective relay 20 is connected to an instrument current transformer 14 and the potential transformer 15, and the output of the instrument current transformer 14 and the output of the potential transformer 15 are input to the protective relay 20. The protective relay 20 is connected to an opening control unit 6. The other parts of the configuration of the present embodiment are identical with those in the first embodiment; the components in FIG. 4 identical with those in FIG. 1 are designated with identical symbols and their detailed description is omitted.

A switching control method according to the present embodiment will now be described. The operation of a power switching control apparatus 1 up to the process to determine a target opening time is as described in the first embodiment. The protective relay 20 detects a fault current after the occurrence of a fault and then outputs a protective relay control output, which serves as an interruption control signal, to the opening control unit 6 immediately.

The protective relay control output from the protective relay 20 functions as a trigger; that is, when the opening control unit 6 receives the protective relay control output, the opening control unit 6 calculates a standby duration to the nearest target opening time and then outputs an interruption control signal to the circuit breaker 11 at the target opening time after the elapse of the standby duration.

Figure 5:
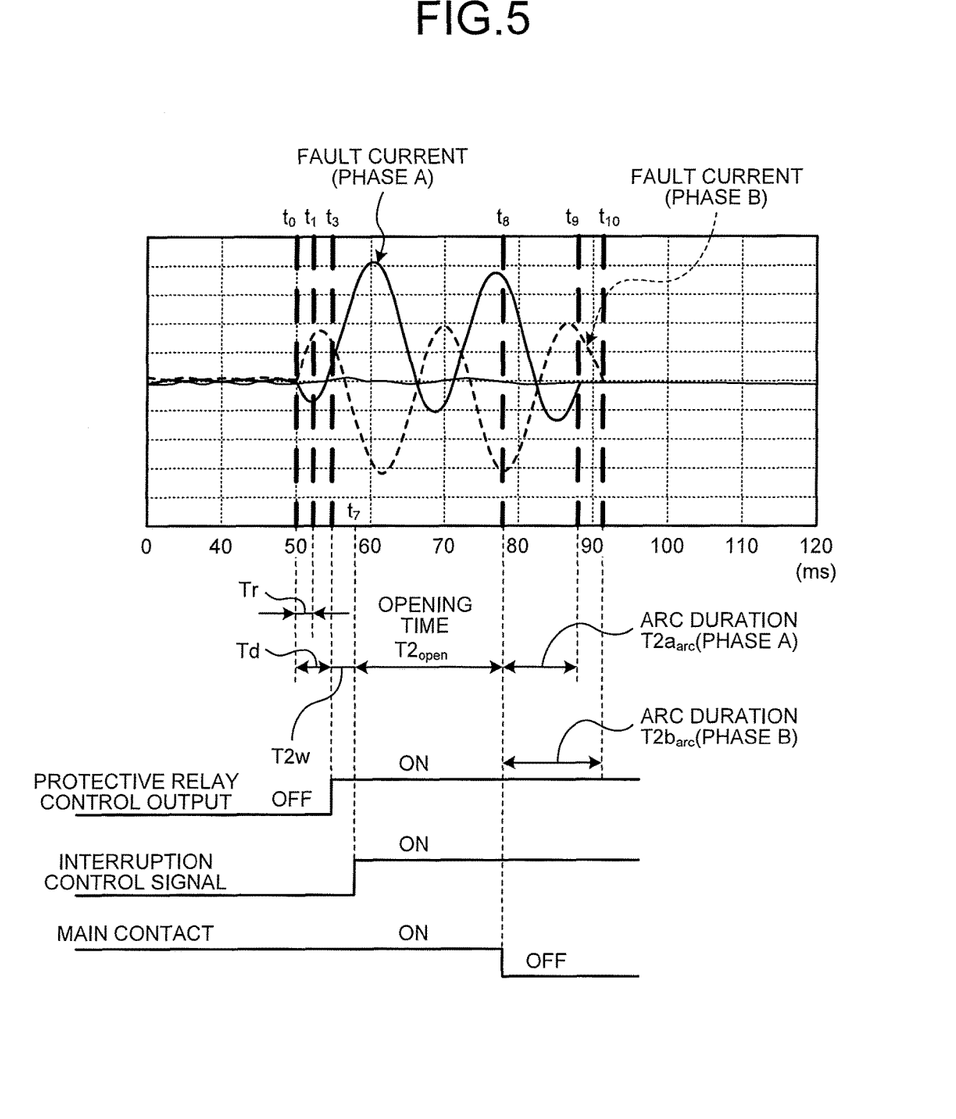
FIG. 5 is a diagram illustrating current behavior before and after the interruption of a fault current and an exemplary control sequence according to the third embodiment.

FIG. 5 is a diagram illustrating a current behavior before and after the interruption of a fault current and an exemplary control sequence according to the present embodiment. The upper part of FIG. 5 illustrates current waveforms with the horizontal axis representing the time (ms) and the vertical axis representing the current value. In the illustrated example, a system fault occurs at a time $t_0$. The system fault is, for example, a double-line-to ground fault in which ground faults have occurred in the phase A and the phase B.

The current measurement unit 3 detects a fault immediately after the time $t_0$. The current measurement unit 3 can, for example, calculate a current effective value from a current measurement value and detect the current effective value being not less than a preset threshold to detect the fault.

When notified of the occurrence of the fault by the current measurement unit 3, the current estimation unit 4 estimates, on the basis of a current waveform measured in a preset given duration $T_r$ from the fault detection time, a current waveform after the elapse of the given duration. In FIG. 5, $t_1-t_0=T_r$ is satisfied, and a current waveform on and after the time $t_1$ is estimated; especially the current waveforms of a fault current (the phase A) and a fault current (the phase B) are estimated. Current waveforms are estimated by determining the waveform parameters of the expression 1. The duration $T_r$ is a short duration of, for example, approximately several ms, which has a length that contains one current zero point at most; the detection and estimation of a fault current waveform is performed during such a short duration.

The target opening time determination unit 5 then determines, on the basis of a current zero point obtained from a current waveform estimated by the current estimation unit 4, an opening time $T2_{open}$ predicted by the opening time prediction unit 7, and a minimum arc duration, that a time that satisfies an expression, the current zero point–(the opening time $T2_{open}$+the minimum arc duration)≥0, be a target opening time. The target opening time determination unit 5 outputs a target opening time to the opening control unit 6.

After the occurrence of the fault, the protective relay 20 detects a fault current in a duration of $T_d$ and outputs a protective relay control output to the opening control unit 6 at a time $t_3$. Here, an expression of $T_d=t_3-t_0$ is satisfied.

With the protective relay control output from the protective relay 20 as a trigger, the opening control unit 6 calculates a standby duration $T2_w=t_7-t_3$ such that an interruption control signal is output to the circuit breaker 11 at the nearest target opening time $t_7$ out of target opening times. After the elapse of the standby duration when the time $t_7$ is reached, the opening control unit 6 outputs an interruption control signal to the circuit breaker 11. The lower part of FIG. 5 illustrates the protective relay control output being ON at and after the time $t_3$, the interruption control signal being ON at and after the time $t_7$, and the main contact (an electrode contact) of the circuit breaker 11 being turned OFF at the time $t_8$. Note that the opening time $T2_{open}$ is expressed by an expression, $t_8-t_7$.

In this case, the arc duration of the fault current (the phase A), $T2a_{arc}=t_9-t_8$, is equal to the minimum arc duration. The arc duration of the fault current (the phase B), $T2b_{arc}=t_{10}-t_8$, is slightly longer than the arc duration of the fault current (the phase A) $T1a_{arc}$.

In the present embodiment, the circuit breaker 11 is interrupted when a fault current is detected by both of the protective relay 20 and the power switching control apparatus 1; thus, the reliability of the system protection is improved. The other effects of the present embodiment are same as described in the first embodiment.

Note that in the cases described in the first to third embodiments, no direct-current component is included in the fault currents, although the first to third embodiments may be applied to the case in which a direct-current component is included in a similar manner. When a direct-current component is included in a fault current, the fault current attenuates according to the gradient of the direct-current component as it oscillates, and the fault current may have no current zero point for a while immediately after the occurrence of the fault due to the existence of the direct-current component. Outputting an interruption control signal immediately after the detection of the fault current in such a case, as in the case with the opening control by a conventional protective relay, results in an increase in the arc duration and an increase in the erosion of an electrode contact, since an arc cannot be extinguished before a current zero point appears. In contrast, the first to third embodiments perform phase control such that the arc duration is minimized, and thus the erosion of an electrode contact can be reduced in such a case. Note that a fault current in which a direct-current component exists is generated, for example, by a short circuit fault that occurs near a power generator.

Fourth Embodiment

In the present embodiment, a method of estimating a current waveform after the occurrence of a fault current by the current estimation unit 4 will be described. The configuration of a power switching control apparatus according to the present embodiment is identical with those in the first to third embodiments, and its description is omitted here.

The procedure to estimate a current waveform is as described below. The steps described below are mainly performed by the current estimation unit 4.

(a) A fault current waveform including n points in a given duration $T_r$ from a waveform acquisition start time is acquired.
(b) A residual matrix [B] and an eigenvalue $\lambda_i$ are calculated by a Matrix Pencil Method.
(c) A fault current estimate waveform y(t) at a time t is generated on the basis of the residual matrix [B] and the eigenvalue $\lambda_i$.

In the first embodiment, y(t) is assumed as on the right side of a following expression 2 to determine the waveform parameters by using, for example, the method of least squares.

[Expression 2]

$$y(t) = \sum_{i=1}^{M} A_i \exp(\sigma_i t)\cos(2\pi f_i t + \phi_i) \qquad (2)$$

In the present embodiment, the Matrix Pencil Method is used to estimate y(t). Details of the Matrix Pencil Method are described in, for example, "Computational Methods for Electric Power Systems, Second Edition, Mariesa L. Crow, CRC Press."

An outline of the Matrix Pencil Method will now be described. With a fault current waveform y(k), which is a measurement value of a fault current, expressed in an expression 3 below, the Matrix Pencil Method provides a method to obtain the eigenvalue $\lambda_i$ and the residual matrix [B].

[Expression 3]

$$y(k) = \sum_{i=1}^{M} B_i z_i^k = \sum_{i=1}^{M} B_i \exp\{(\lambda_i \Delta t)k\} \qquad (3)$$

Here, M represents the number of modes, $\Delta t$ represents a sampling time interval, and k represents the sampling number (=0, 1, . . . , n−1). Additionally, $B_i$ is an initial value and is a diagonal component of the residual matrix [B].

Figure 6:
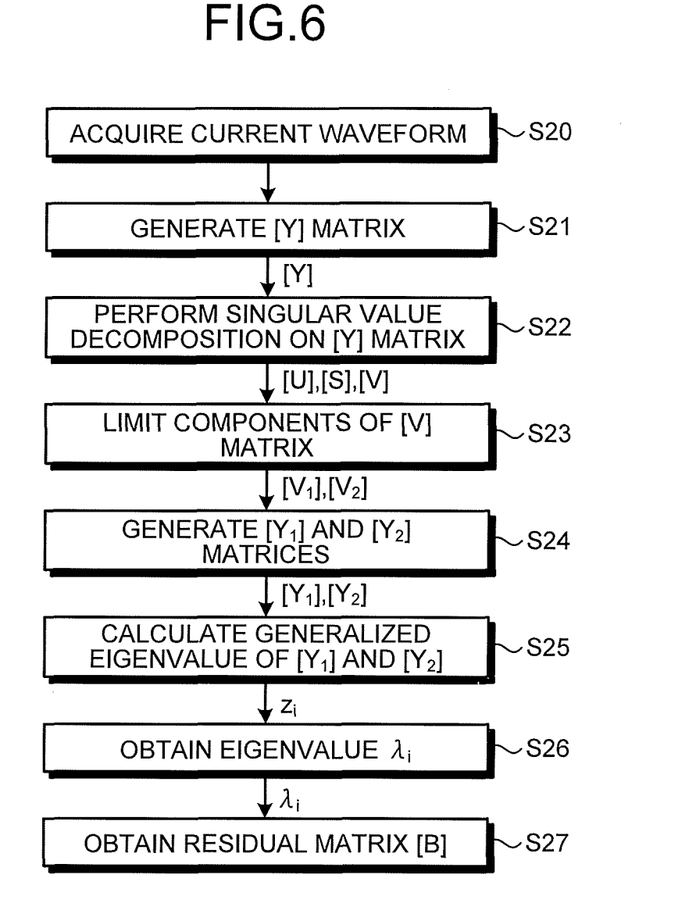
FIG. 6 is a flowchart illustrating a calculation process of an eigenvalue $\lambda_i$ and a residual matrix $[B]$.

FIG. 6 is a flowchart illustrating a calculation process of the eigenvalue $\lambda_i$ and the residual matrix [B]. The current estimation unit 4 acquires the fault current waveform y(k) (k=0, 1, . . . , n−1) (S20) and generates a matrix [Y] below from the acquired fault current waveform y(k) (S21).

[Expression 4]

$$[Y] = \begin{bmatrix} y(0) & y(1) & \cdots & y(L) \\ y(1) & y(2) & \cdots & y(L+1) \\ \vdots & \vdots & \ddots & \vdots \\ y(N-L) & y(N-L+1) & \cdots & y(N) \end{bmatrix} \quad (4)$$

Here, N=n−1, and L is a pencil parameter. The pencil parameter may be, for example, L=N/2.

The current estimation unit 4 then performs singular value decomposition on the matrix [Y] as $[Y]=[U][S][V]^T$ to obtain matrices [U], [S], and [V] (S22). Here, [S] is a matrix having singular values as diagonal components. Additionally, [U] and [V] are real unitary matrices containing eigenvectors respectively of $[Y][Y]^T$ and $[Y]^T[Y]$. Here, T represents transposition. The matrices [U], [S], and [V] are expressed with components as blow.

[Expression 5]

$$[U] = \begin{bmatrix} u_{1,1} & u_{1,2} & \cdots & u_{1,N-L+1} \\ u_{2,1} & u_{2,2} & \cdots & u_{2,N-L+2} \\ \vdots & \vdots & \ddots & \vdots \\ u_{N-L+1,1} & u_{N-L+1,2} & \cdots & u_{N-L+1,N-L+1} \end{bmatrix} \quad (5)$$

[Expression 6]

$$[S] = \begin{bmatrix} s_{1,1} & s_{1,2} & \cdots & s_{1,L+1} \\ s_{2,1} & s_{2,2} & \cdots & s_{2,L+1} \\ \vdots & \vdots & \ddots & \vdots \\ s_{N-L+1,1} & s_{N-L+1,2} & \cdots & s_{N-L+1,L+1} \end{bmatrix} \quad (6)$$

[Expression 7]

$$[V] = \begin{bmatrix} v_{1,1} & v_{1,2} & \cdots & v_{1,L+1} \\ v_{2,1} & v_{2,2} & \cdots & v_{2,L+1} \\ \vdots & \vdots & \ddots & \vdots \\ v_{L+1,1} & v_{L+1,2} & \cdots & v_{L+1,L+1} \end{bmatrix} \quad (7)$$

The current estimation unit 4 then extracts part of matrix elements from [V] obtained by the singular value decomposition so as to obtain $[V_1]$ and $[V_2]$ (S23). Specifically, the current estimation unit 4 employs M pieces of singular values in the descending order on the basis of a predetermined parameter M in order to limit the number of effective components.

[Expression 8]

$$[V_1] = \begin{bmatrix} v_{1,1} & v_{1,2} & \cdots & v_{1,M} \\ v_{2,1} & v_{2,2} & \cdots & v_{2,M} \\ \vdots & \vdots & \ddots & \vdots \\ v_{L,1} & v_{L,2} & \cdots & v_{L,M} \end{bmatrix} \quad (8)$$

[Expression 9]

$$[V_2] = \begin{bmatrix} v_{2,1} & v_{2,2} & \cdots & v_{2,M} \\ v_{3,1} & v_{3,2} & \cdots & v_{3,M} \\ \vdots & \vdots & \ddots & \vdots \\ v_{L+1,1} & v_{L+1,2} & \cdots & v_{L+1,M} \end{bmatrix} \quad (9)$$

The current estimation unit 4 then generates matrices $[Y_1]$ and $[Y_2]$ from $[V_1]$ and $[V_2]$ (S24). Here, they are expressed as follows:

$[Y_1]=[V_1]^T \times [V_1]$ $[Y_2]=[V_2]^T \times [V_1].$

The current estimation unit 4 then evaluates an expression (10) below to calculate a vector [z] formed of generalized eigenvalues of the matrices $[Y_1]$ and $[Y_2]$ (S25).

[Expression 10]

$$[Y_2]-\lambda[Y_1]=[Z_1][B]\{[Z_0]-\lambda[I]\}[Z_2] \quad (10)$$

Note that [B] represents a residual matrix, [I] represents a unit matrix of M×M, and $[Z_0]$ to $[Z_2]$ are as expressed below.

[Expression 11]

$$[Z_0] = \text{diag}[z_1, z_2, \ldots z_M] \quad (11)$$

[Expression 12]

$$[Z_1] = \begin{bmatrix} 1 & 1 & \cdots & 1 \\ z_1 & z_2 & \cdots & z_M \\ \vdots & \vdots & & \vdots \\ z_1^{(N-L-1)} & z_2^{(N-L-1)} & \cdots & z_M^{(N-L-1)} \end{bmatrix} \quad (12)$$

[Expression 13]

$$[Z_2] = \begin{bmatrix} 1 & z_1 & \cdots & z_1^{L-1} \\ 1 & z_2 & \cdots & z_2^{L-1} \\ \vdots & \vdots & & \vdots \\ 1 & z_M & \cdots & z_M^{L-1} \end{bmatrix} \quad (13)$$

The current estimation unit 4 then obtains an eigenvalue vector $[\lambda]$ from $[z]=(z_1, z_2, \ldots, z_M)^T$ (S26).

[Expression 14]

$$\lambda_i = \frac{\ln(z_i)}{\Delta t} \quad (14)$$

The current estimation unit 4 also obtains the residual matrix [B] from the relation below (S27).

[Expression 15]

$$\begin{bmatrix} z_1^0 & z_2^0 & \cdots & z_M^0 \\ z_1^1 & z_2^1 & \cdots & z_M^1 \\ \vdots & \vdots & & \vdots \\ z_1^N & z_2^N & \cdots & z_M^N \end{bmatrix} \begin{bmatrix} B_1 \\ B_2 \\ \vdots \\ B_M \end{bmatrix} = \begin{bmatrix} y(0) \\ y(1) \\ \vdots \\ y(N) \end{bmatrix} \quad (15)$$

The current estimation unit 4 further calculates the fault current estimate waveform y(t) at any time t by substitution of the eigenvalues $\lambda_i$ and $B_i$ obtained through the expression (14) and the expression (15) into an expression (16) below.

[Expression 16]

$$y(t) = \sum_{i=1}^{M} B_i e^{\lambda_i t} \quad (16)$$

In this manner, the Matrix Pencil Method calculates on the basis of matrix operation and by extracting a component of a large amplitude (singular value), thereby reducing the calculation time and improving the calculation precision.

As described above, the present embodiment estimates a current waveform as a composite waveform of multifrequencies by using the Matrix Pencil Method, thereby reducing the calculation time and improving the calculation precision.

INDUSTRIAL APPLICABILITY

As described above, the present invention is useful as a power switching control apparatus and a switching control method thereof.

REFERENCE SIGNS LIST

1 power switching control apparatus, 3 current measurement unit, 4 current estimation unit, 5 target opening time determination unit, 6 opening control unit, 7 opening time prediction unit, 8 operating environmental condition, 10 power source, 11 circuit breaker, 12 main circuit, 13 transmission line, 14 instrument current transformer, 15 potential transformer, 20 protective relay, 21 AND circuit.

The invention claimed is:

1. A power switching control apparatus, comprising:
   a current sensor to measure a current of a main circuit connected to a circuit breaker placed in a power system;
   a current estimator to
      detect a fault current on a basis of a current measurement value measured by the current sensor and
      estimate, on a basis of a current waveform measured in a preset given duration from a time at which the fault current is detected, a current waveform after the given duration has elapsed;
   a target opening time determiner to determine a time obtained by subtracting a sum of an opening time and a minimum arc duration from a current zero point as a target opening time by using
      the current zero point, which is a time the current, of which a current waveform is estimated by the current estimator, becomes zero,
      a predicted opening time, and
      the minimum arc duration, which is a minimum duration necessary after opening of electrode contacts of the circuit breaker until an arc between the electrode contacts is extinguished; and
   an opening controller to
      calculate a standby duration for reaching a nearest one of the target opening times,
      wait for the standby duration, and
      transmit an interruption control signal for interrupting the circuit breaker when the target opening time is reached,
   wherein the given duration has a length that contains equal to or less than two current zero points, and
   wherein the current estimator
      calculates a current effective value by using a current measurement value measured by the current sensor and
      detects a fault current in a case in which the current effective value is not less than a preset threshold.

2. The power switching control apparatus according to claim 1, wherein
   the current estimator estimates the current waveform by a method of least squares.

3. The power switching control apparatus according to claim 1, wherein
   the current estimator estimates the current waveform by the Matrix Pencil Method.

4. The power switching control apparatus according to claim 1, comprising an opening time predictor to predict an opening time of the circuit breaker.

5. The power switching control apparatus according to claim 1, wherein
   the power system is provided with
      a protective relay and
      an AND circuit connected to the protective relay, the opening controller, and the circuit breaker, and
   the AND circuit, when receiving a protective relay control output, which is output from the protective relay after detection of a fault current by the protective relay and which functions as an interruption control signal, and when receiving the interruption control signal from the opening controller, outputs the interruption control signal to the circuit breaker.

6. The power switching control apparatus according to claim 1, wherein
   the power system is provided with a protective relay, and
   the opening controller receives a protective relay control output, which is output from the protective relay after detection of a fault current by the protective relay and which functions as an interruption control signal, and
   the opening controller when receiving the protective relay control output from the protective relay,
      calculates a standby duration for reaching the nearest one of the target opening times, and
      outputs the interruption control signal to the circuit breaker when the target opening time is reached.

7. A power switching control apparatus, comprising:
   a current sensor to measure a current of a main circuit connected to a circuit breaker placed in a power system;
   a current estimator to
      detect a fault current on a basis of a current measurement value measured by the current sensor and
      estimate, on a basis of a current waveform measured in a preset given duration from a time at which the fault current is detected, a current waveform after the given duration has elapsed;
   a target opening time determiner to determine a time obtained by subtracting a sum of an opening time and a minimum arc duration from a current zero point as a target opening time by using the current zero point, which is a time the current, of which a current waveform is estimated by the current estimator, becomes zero, a predicted opening time, and the minimum arc duration, which is a minimum duration necessary after opening of electrode contacts of the circuit breaker until an arc between the electrode contacts is extinguished; and an opening controller to calculate a standby duration for reaching a nearest one of the target opening times, wait for the standby duration, and transmit an interruption control signal for interrupting the circuit breaker when the target opening time is reached, wherein the current estimator estimates a current waveform as a composite waveform of multifrequencies, and wherein the current estimator calculates a current effective value by using a current measurement value measured by the current sensor and detects a fault current in a case in which the current effective value is not less than a preset threshold.

8. The power switching control apparatus according to claim 7, wherein the given duration has a length that contains equal to or less than two current zero points.

9. The power switching control apparatus according to claim 7, wherein the current estimator estimates the current waveform by a method of least squares.

10. The power switching control apparatus according to claim 7, wherein the current estimator estimates the current waveform by the Matrix Pencil Method.

11. The power switching control apparatus according to claim 7, comprising an opening time predictor to predict an opening time of the circuit breaker.

12. The power switching control apparatus according to claim 7, wherein the power system is provided with a protective relay and an AND circuit connected to the protective relay, the opening controller, and the circuit breaker, and the AND circuit, when receiving a protective relay control output, which is output from the protective relay after detection of a fault current by the protective relay and which functions as an interruption control signal, and when receiving the interruption control signal from the opening controller, outputs the interruption control signal to the circuit breaker.

13. The power switching control apparatus according to claim 7, wherein the power system is provided with a protective relay, and the opening controller receives a protective relay control output, which is output from the protective relay after detection of a fault current by the protective relay and which functions as an interruption control signal, and the opening controller, when receiving the protective relay control output from the protective relay, calculates a standby duration for reaching the nearest one of the target opening times, and outputs the interruption control signal to the circuit breaker when the target opening time is reached.

14. A power switching control apparatus, comprising:

a current sensor to measure a current of a main circuit connected to a circuit breaker placed in a power system;

a current estimator to detect a fault current on a basis of a current measurement value measured by the current sensor and estimate, on a basis of a current waveform measured in a preset given duration from a time at which the fault current is detected, a current waveform after the given duration has elapsed;

a target opening time determiner to determine a time obtained by subtracting a sum of an opening time and a minimum arc duration from a current zero point as a target opening time by using the current zero point, which is a time the current, of which a current waveform is estimated by the current estimator, becomes zero, a predicted opening time, and the minimum arc duration, which is a minimum duration necessary after opening of electrode contacts of the circuit breaker until an arc between the electrode contacts is extinguished; and an opening controller to calculate a standby duration for reaching the nearest one of the target opening times, wait for the standby duration, and transmit an interruption control signal for interrupting the circuit breaker when the target opening time is reached, wherein the current estimator estimates the current waveform by the Matrix Pencil Method, and wherein the current estimator calculates a current effective value by using a current measurement value measured by a current measurement unit and detects a fault current in a case in which the current effective value is not less than a preset threshold.

15. The power switching control apparatus according to claim 14, comprising an opening time predictor to predict an opening time of the circuit breaker.

16. The power switching control apparatus according to claim 14, wherein the power system is provided with a protective relay and an AND circuit connected to the protective relay, the opening controller, and the circuit breaker, and the AND circuit, when receiving a protective relay control output, which is output from the protective relay after detection of a fault current by the protective relay and which functions as an interruption control signal, and when receiving the interruption control signal from the opening controller, outputs the interruption control signal to the circuit breaker.

17. The power switching control apparatus according to claim 14, wherein the power system is provided with a protective relay, and the opening controller receives a protective relay control output, which is output from the protective relay after detection of a fault current by the protective relay and which functions as an interruption control signal, and the opening controller, when receiving the protective relay control output from the protective relay,
calculates a standby duration for reaching the nearest one of the target opening times, and
outputs the interruption control signal to the circuit breaker when the target opening time is reached.

* * * * *